(12) United States Patent
Luizello et al.

(10) Patent No.: US 11,883,744 B2
(45) Date of Patent: Jan. 30, 2024

(54) MEMORY-BASED MOTIVATIONAL MODE

(71) Applicant: SONY INTERACTIVE ENTERTAINMENT LLC, San Mateo, CA (US)

(72) Inventors: Alessandra Luizello, San Mateo, CA (US); Courtney Yingling, San Mateo, CA (US); Kristine Young, San Mateo, CA (US); Rui Yang, San Mato, CA (US); Celeste Bean, San Mateo, CA (US); Tatianna Manzon-Gutzman, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 162 days.

(21) Appl. No.: 17/510,922

(22) Filed: Oct. 26, 2021

(65) Prior Publication Data

US 2023/0129827 A1  Apr. 27, 2023

(51) Int. Cl.
*A63F 13/65* (2014.01)
*A63F 13/212* (2014.01)
*H04L 65/1069* (2022.01)
*H04L 65/1083* (2022.01)

(52) U.S. Cl.
CPC ............ *A63F 13/65* (2014.09); *A63F 13/212* (2014.09); *H04L 65/1069* (2013.01); *H04L 65/1083* (2013.01)

(58) Field of Classification Search
None
See application file for complete search history.

(56) References Cited

U.S. PATENT DOCUMENTS

| 2017/0095732 A1* | 4/2017 | Ghaffari | ............... A63F 13/212 |
| 2020/0206631 A1* | 7/2020 | Sumant | ................. G06V 40/20 |

* cited by examiner

*Primary Examiner* — Kevin Y Kim
(74) *Attorney, Agent, or Firm* — Polsinelli LLP

(57) ABSTRACT

A method and system for providing a memory-based motivational mode in virtual reality is disclosed. A plurality of virtual reality datasets is stored, each virtual reality dataset including data regarding a different set of stimuli and corresponding biometric data of a player. Launching a virtual reality session includes presenting a current set of stimuli to the player in a virtual reality environment of an interactive content title. A plurality of virtual reality datasets is stored. Each virtual reality dataset includes data regarding a different set of stimuli and corresponding biometric data of a player. Real-time biometric data is tracked and associated with the current set of stimuli presented to the player. The current set of stimuli of the virtual reality environment is updated based on a set of stimuli from an identified virtual reality dataset that include the biometric data corresponding to an identified change.

20 Claims, 5 Drawing Sheets

| Object | Events |
|---|---|
| Activity | activityAvailabilityChange (id[])<br>activityStart (id,location)<br>activityEnd(id,outcome,location) |
| Zone | locationChange (id,location) |
| Actor | actorSelect (id[]) |
| Mechanic | mechanicAvailabilityChange (id[])<br>mechanicInventoryChange (id[])<br>mechanicLoadoutChange (id[])<br>mechanicUse (id[])<br>mechanicImpact (id) |
| Game Media | gameMediaUnlock (id)<br>gameMediaStart (id)<br>gameMediaEnd (id) |

FIG. 3

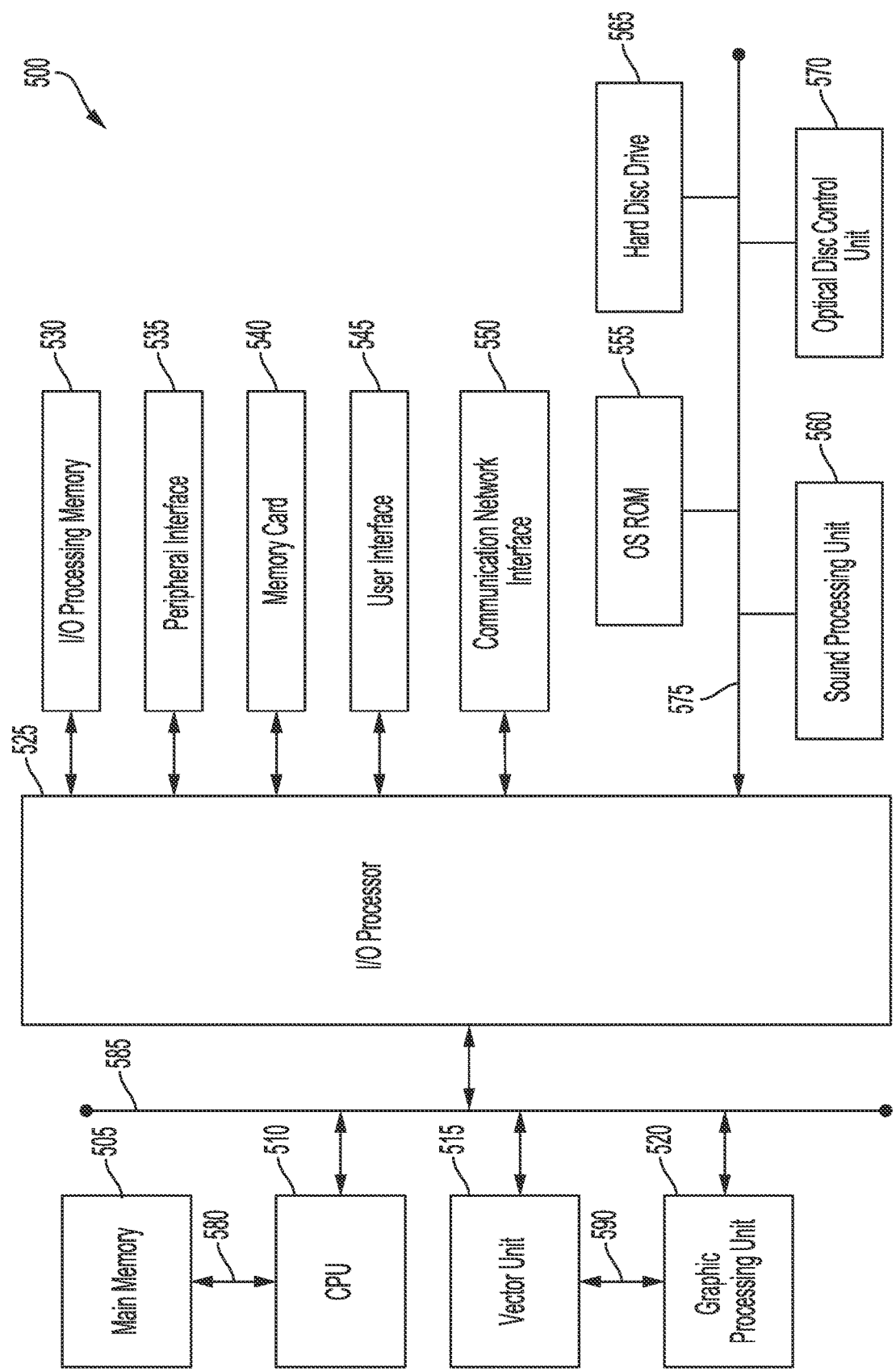

MEMORY-BASED MOTIVATIONAL MODE

BACKGROUND OF THE INVENTION

1. Field of Invention

The present invention generally relates to providing a memory-based motivational mode in virtual reality environments. More specifically, the present invention relates to customizing stimuli associated with a virtual reality environment based on biometric data.

2. Description of the Related Art

Presently available interactive media titles, including virtual reality media titles and game titles, may be engaged by one or more users in a virtual reality environment during an interactive session. Virtual reality systems may generate a display of the virtual environment for presentation to a user (e.g., head-mounted display, VR headset, projection device). Various peripheral devices may also be used to enhance user interaction with the virtual environment generated by the virtual reality systems.

As the player navigates the virtual environment using such devices and systems, different audio-visuals associated with the displayed virtual environment may be presented and updated in real-time responsive to navigation actions by the player. For example, it may be determined what type of movements the player is engaged in, and the determined movements may be analyzed, characterized, and used to change the display of the virtual environment (e.g., locations, virtual elements, status interfaces, controller interfaces, menus). For example, some virtual reality media titles may present images of virtual objects or virtual environments for the player to engage with or move around. Such interaction by the player may include performing physical movements in the real-world. Such real-world movements may be detected by cameras or other sensors, as well as translated into movements or actions in the virtual environment.

Different virtual reality titles and applications may have different purposes, including entertainment, exercise or performing other physical movements, demonstrative, education, etc., that may be pursued in an at least partially immersive virtual environment in which different audio-visual stimuli may be presented. Players may find different virtual reality conditions associated with such stimuli preferable to others, however, and such preferences may vary from player to player. For example, musical tastes may different, as do different player's responses to the same. What one player may find engaging and exciting may not have the same response from another player.

Many immersive experiences offered by virtual reality media titles are provided in the same way across all players, however. Thus, presently available virtual reality media titles do not provide customized experiences for different players. Nor do any virtual media titles provide for different types of modes based on certain groups being motivated by positive reinforcement (e.g., encouragement or rewards such as chasing after treasure) and other groups being motivated by negative reinforcement (e.g., in-game punishments or threats such as being chased by a zombie).

Therefore, there is a need to provide improved systems and methods of providing different memory-based motivational modes in virtual reality environments.

SUMMARY OF THE CLAIMED INVENTION

A method for providing a memory-based motivational mode in virtual reality environments is disclosed. The method may include storing a plurality of virtual reality datasets, each virtual reality dataset including data regarding a different set of stimuli and corresponding biometric data of a player. The method may also include launching a virtual reality session for the player. Launching the virtual reality session includes presenting a current set of stimuli to the player in a virtual reality environment of an interactive content title. The method may further include tracking real-time biometric data during the virtual reality session. The tracked real-time biometric data is associated with the current set of stimuli presented to the player. The method may identify that a change to the real-time biometric data is warranted. The identified change corresponds to the biometric data in one or more of the virtual reality datasets. The method may further include updating the current set of stimuli of the virtual reality environment based on the set of stimuli from at least one of the identified virtual reality datasets that include the biometric data corresponding to the identified change.

A system for providing a memory-based motivational mode in virtual reality environments is disclosed. The system includes a memory and a processor that executes instructions stored in memory, wherein execution of the instructions by the processor may store a plurality of virtual reality datasets, each virtual reality dataset including data regarding a different set of stimuli and corresponding biometric data of a player. The execution of the instructions by the processor also may cause to launch a virtual reality session for the player, wherein launching the virtual reality session includes presenting a current set of stimuli to the player in a virtual reality environment of an interactive content title. The execution of the instructions by the processor also may track real-time biometric data during the virtual reality session, wherein the tracked real-time biometric data is associated with the current set of stimuli presented to the player. The execution of the instructions by the processor also may cause to identify that a change to the real-time biometric data is warranted, wherein the identified change corresponds to the biometric data in one or more of the virtual reality datasets. The execution of the instructions by the processor also may cause to update the current set of stimuli of the virtual reality environment based on the set of stimuli from at least one of the identified virtual reality datasets that include the biometric data corresponding to the identified change.

A non-transitory computer-readable storage medium, having embodied thereon a program executable by a processor to perform a method for providing a memory-based motivational mode in virtual reality environments is disclosed. The method may include storing a plurality of virtual reality datasets each including data regarding a different set of stimuli and corresponding biometric data of a player. The method may also include launching a virtual reality session for the player, wherein launching the virtual reality session includes presenting a current set of stimuli to the player in a virtual reality environment of an interactive content title. The method may further include tracking real-time biometric data during the virtual reality session, wherein the tracked real-time biometric data is associated with the current set of stimuli presented to the player. The overlay may include a ghost projection based on the indicated dataset. The method may include identifying that a change to the real-time biometric data is warranted, wherein the identified change corresponds to the biometric data in one or more of the virtual reality datasets. The method may include updating the current set of stimuli of the virtual reality environment based on the set of stimuli from at least one of the identified virtual reality datasets that include the biometric data corresponding to the identified change.

BRIEF DESCRIPTION OF THE DRAWINGS

FIG. 3 illustrates an exemplary table of various objects and associated events.

FIG. 5 is a block diagram of an exemplary electronic entertainment system, according to some aspects of the present disclosure.

DETAILED DESCRIPTION

Embodiments of the present invention include systems and methods for providing a memory-based motivational mode in virtual reality environments is disclosed. The method may include storing a plurality of virtual reality datasets, each virtual reality dataset including data regarding a different set of stimuli and corresponding biometric data of a player. The method may also include launching a virtual reality session for the player. Launching the virtual reality session includes presenting a current set of stimuli to the player in a virtual reality environment of an interactive content title. The method may further include tracking real-time biometric data during the virtual reality session. The tracked real-time biometric data is associated with the current set of stimuli presented to the player. The method may identify that a change to the real-time biometric data is warranted. The identified change corresponds to the biometric data in one or more of the virtual reality datasets. The method may further include updating the current set of stimuli of the virtual reality environment based on the set of stimuli from at least one of the identified virtual reality datasets that include the biometric data corresponding to the identified change.

Figure 1:
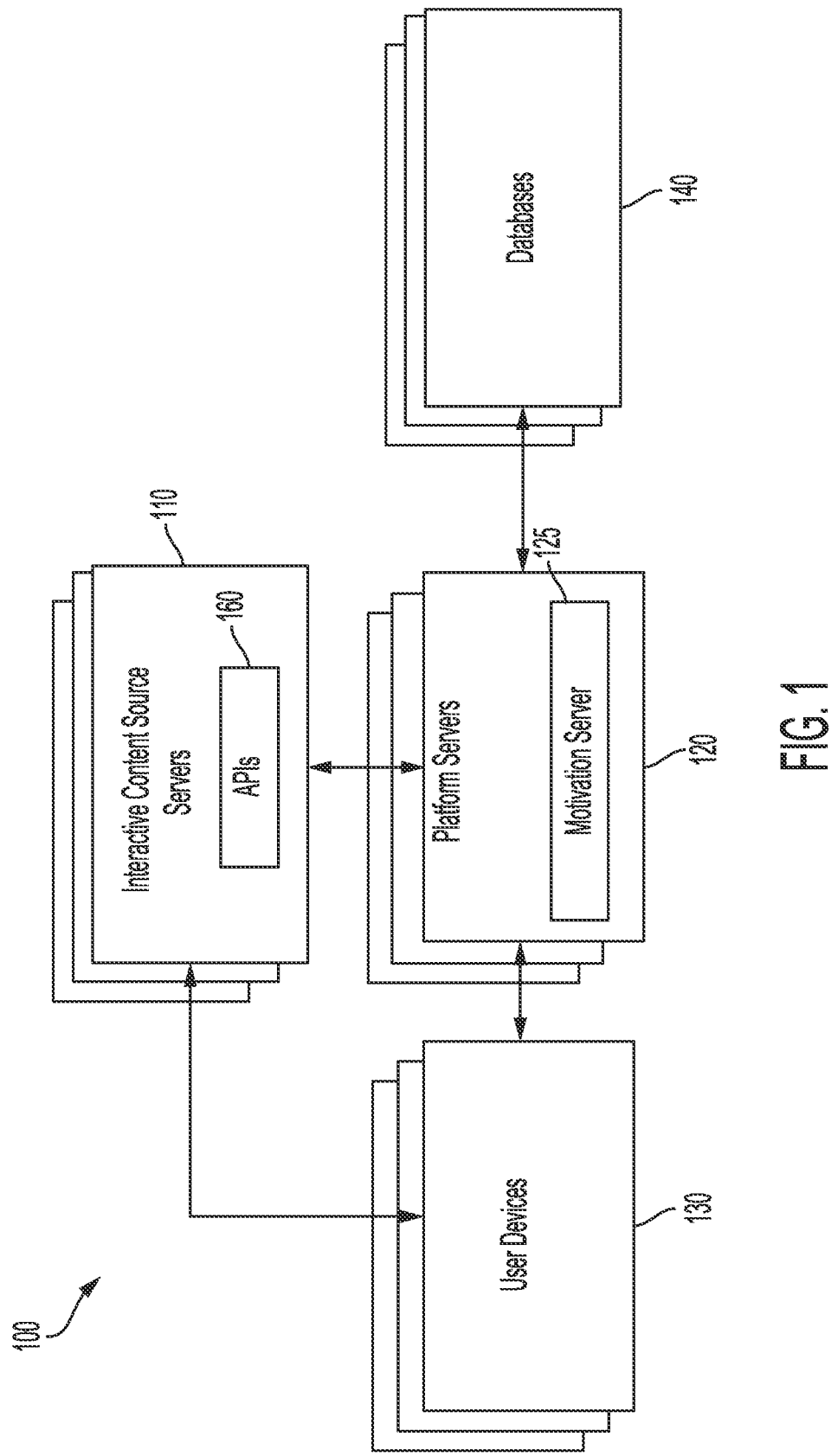
FIG. 1 illustrates an exemplary network environment in which a system for providing a memory-based motivational mode in virtual reality may be implemented.

FIG. 1 illustrates an exemplary network environment in which a system for providing a memory-based motivational mode in virtual reality may be implemented. The network environment 100 may include one or more interactive content servers 110 that provide streaming content (e.g., interactive video, interactive virtual reality videos, etc.), one or more platform servers 120 including a motivation server 125, one or more user devices 130, and one or more databases 140.

Interactive content source servers 110 may maintain, stream, and host a variety of digital content (including interactive media content) and digital services available for distribution over a communication network. Such interactive content source servers 110 may be implemented in the cloud (e.g., one or more cloud servers). The interactive content source servers 110 may be associated with any content provider that makes its content available for access over a communication network. The interactive content source servers 110 may therefore host a variety of different content titles, which may further have be associated with object data regarding a digital or virtual object (e.g., activity information, zone information, character information, player information, other game media information, etc.) displayed in a digital or virtual environment during an interactive session. Each media title hosted by interactive content source servers 110 may include one or more sets of object data that may be available for participation with (e.g., viewing or interacting with an activity) by a user. Data about the object shown in the media may be stored by the interactive content source servers 110, platform servers 120 and/or the user device 130, in an object file 216 ("object file"), as will be discussed in detail with respect to FIG. 2.

Such digital content hosted by interactive content source servers 110 may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 130 may participate in a gameplay session concurrent with one or more communication sessions, and the gameplay and communication sessions may be hosted on one or more of the interactive content source servers 110.

The platform servers 120 may be responsible for communicating with the different interactive content servers 110, databases 140, and user devices 130. Such platform servers 120 may be implemented on one or more cloud servers. The interactive content source servers 110 may communicate with multiple platform servers 120, though the interactive content source servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, mechanic information, game media information, etc.) displayed during at least a portion of the streaming media.

The platform servers 120 may include a motivation server 125 that receives datasets (e.g., from databases 140) that include past biometric data captured by various sensors during past virtual reality sessions and conditions/stimuli that were present when such biometric data was captured. Such conditions/stimuli may be the result of different combinations of the user devices 130 and associated peripherals operating in tandem at specific settings. The datasets may further include instructions for implementing the specific settings on the associated peripherals in order to generate the specific associated conditions/stimuli during an interactive session. For example, a first set of stimuli may include audio-visual and other sensory stimuli associated with generating a virtual environment in which a ghost chasing the player who is on the hunt for a leprechaun's pot of gold. Such stimuli may include specific background music, sounds, narrations, graphics, and animation, as well as other sensory stimuli devices such as fans, humidifiers, haptic feedback devices, and the like. Meanwhile, a second set may only include stimuli corresponding to a ghost chasing the player, a third set may include stimuli corresponding to the leprechaun and the pot of gold, and yet further sets may include stimuli corresponding to different in-game conditions.

In such an example, the first set of stimuli may be linked to a first set of corresponding biometric data that indicates an average 9:38 mile pace and a 130 BPM heart rate, whereas the second set of stimuli may be linked to a second set of corresponding biometric data that indicates an average 9:20 mile pace and a 135 BPM heart rate. As such, it may be determined that adding rewards at a certain distance improves the "motivation" for the player, but not substantially. Whether it is because the player has hit their limit or the player is not as motivated by the reward, the motivation server 125 may learn from such patterns and correlations regarding what device settings and virtual reality stimuli result in specific reactions by each player. In addition, motivation server 125 may use such insights to adjust the local conditions and stimuli for different players, even those in the same virtual environment, so as to provide a custom experience and promote successful gameplay for each player in accordance with their specific motivations.

During the tracking of real-time biometric data, the motivation server 125 may identify that a change in the real-time biometric data is warranted. For example, the player's heart rate has steadily declined for the past 10 minutes. Based on such an identified change, the motivation server 125 may update the current set of stimuli in a virtual environment viewed at a virtual reality headset by the player, for example. The updating may be based on received or learned preferences associated with the player and comparing the real-time biometric data to that of the received or learned preferences. For example, the player may be extremely motivated by adding cheering fans that can quickly boost the player's physical exertion to quickly bring the player's heart rate back up by an average of 20 BPM. Furthermore, if the identified changes reach a delta between the tracked real-time biometric data and a stored goal, selecting identified virtual reality dataset may be based on the delta.

A learning model may be trained based on historical and current sets of stimuli and associated biometric data by correlating each stimulus to changes in performance and biometric data. Stimuli changes may be at least one of changes of a music type, a temperature, audio-visuals, and/or other sensory effects. In addition to, or incorporated in, a virtual reality headset, sensory-controlling components may be used to provide a more immersive environment in the virtual reality environment. For example, a sensory-controlling component may control temperature, add spraying of water, create a tapping sensation, etc. Immersive effects may associate such changes in sensory effects with stimuli in the virtual environment, such as adding a warm effect indicating that if the player keeps pace the player will get to finish early, pairing a scary animal growling with the spraying of water, or pairing a tapping sensation with a zombie behind the player. Furthermore, environmental conditions, such as the temperature inside the headset exceeding a threshold temperature or the virtual reality headset fogging up, may trigger a sensory-controlling component to add a sensory effect (e.g., cooling by turning on or increasing intensity of a fan).

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different virtual reality systems, gaming consoles, mobile devices, laptops, and desktops, as well as a variety of different peripheral devices. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). The user device 130 may include one or more peripheral devices that allow the user to interact with a virtual environment, such as a head-mounted display, virtual reality headset, projector, cameras, sensors, etc. In some implementations, content titles involving physical movement may operate in conjunction with motion platforms, treadmills, other exercise equipment (e.g., stationary bikes, strength fitness machines, etc.), and other objects associated with or that have embedded sensors.

The databases 140 may be stored on the platform servers 120, the media streaming servers 110, any of the servers 218 (shown in FIG. 2), on the same server, on different servers, on a single server, across different servers, or on any of the user devices 130. Such databases 140 may store the streaming media and/or an associated set of object data. Such streaming media may depict one or more objects (e.g., activities) that a user can participate in or interact with. One or more user profiles may also be stored in the databases 140. Each user profile may include information about the user (e.g., user progress in an activity and/or media content title, user id, user game characters, etc.) and may be associated to media.

In an exemplary embodiment of the present invention, platform servers 120 may capture data, including object data and corresponding biometric data, regarding current sessions. One current session may include a user using user device 130, such as a virtual reality headset, to access and engage with an interactive content title hosted by interactive content servers 110. During gameplay of a particular game title, for example, platform servers 120 may record real-time biometric data and corresponding gameplay data (including video, metadata regarding in-game status and actions, etc.) sufficient to recreate the gameplay of a current session in a future gameplay session. Data regarding the particular in-game activity may also be captured (and described in further detail in relation to FIG. 2) and stored in database(s) 140. Object data may include audiovisual and/or sensory components that are effectuated in a virtual environment of a current session. The object data may be associated with timestamps. The real-time biometric data may also be associated with timestamps. Therefore, the motivation server 125 may determine if certain audiovisual and/or sensory components contributed to changes in the biometric data.

In an exemplary implementation, databases 140 may store information regarding a plurality of past and current sessions, including the object data and biometric data that have been identified within each corresponding media file. Platform servers 120 may further analyze gameplay data from a current session associated with a specific player in real-time to identify how various audiovisual and/or sensory components associated with object data effect biometric data, such as positively, negatively, or has little to no effect. Such analysis may further include evaluation in comparison to historical gameplay data and metadata of the same player or of other players of the same or similar game titles as stored in databases 140. Historical gameplay data may indicate patterns regarding what conditions are associated with the player giving up and conversely, what conditions are associated with the player persisting during gameplay. Such patterns may be used to generate new sets of stimuli or to customize existing sets of stimuli to motivate a particular player to continue gameplay.

Figure 2:
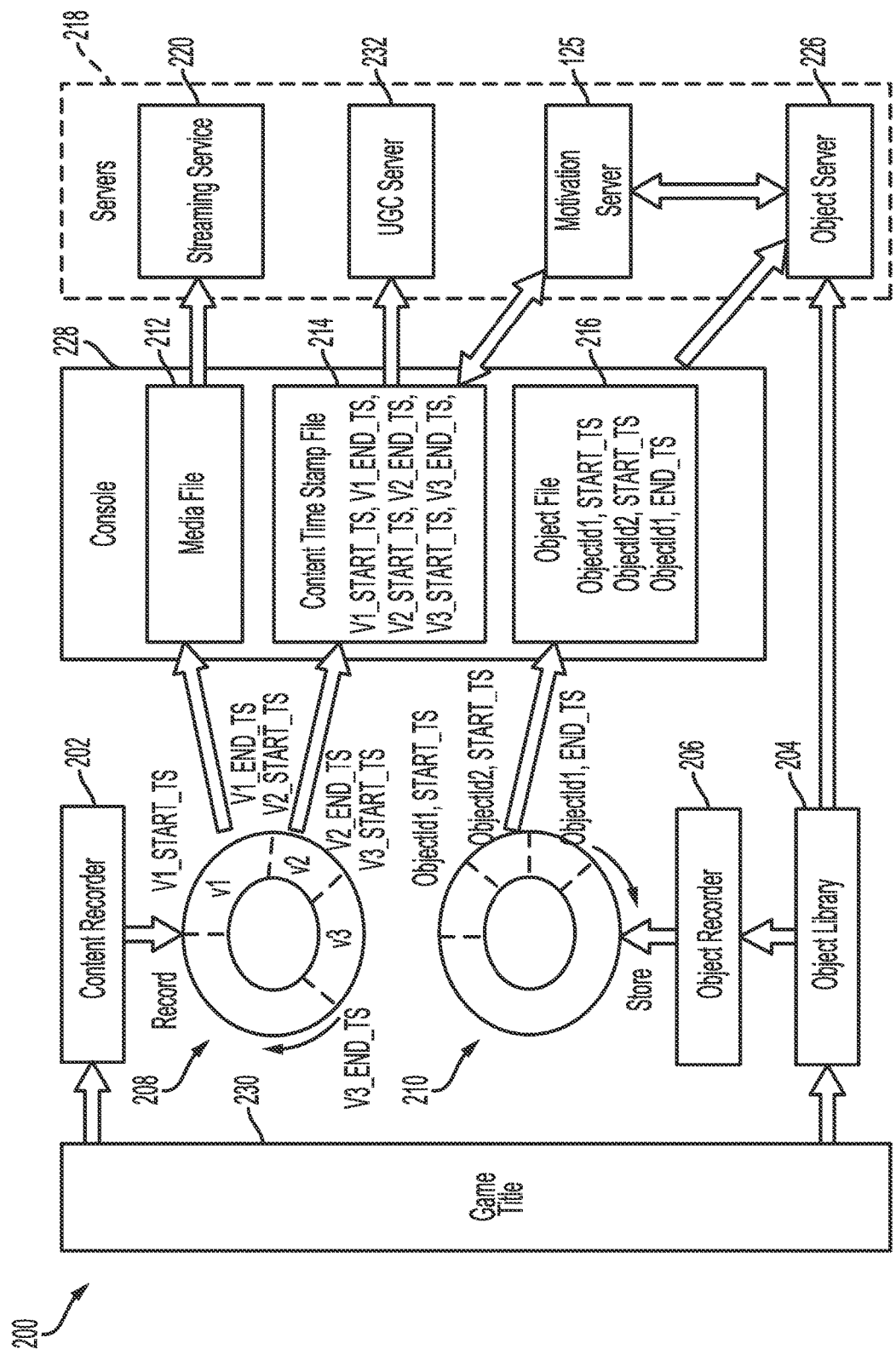
FIG. 2 illustrates an exemplary uniform data system (UDS) that may be used to provide data to a system for providing a memory-based motivational mode in virtual reality.

FIG. 2 illustrates an exemplary uniform data system (UDS) that may be used to provide data to a system for providing a memory-based motivational mode in virtual reality. Based on data provided by UDS, the motivation server 125 can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2, an exemplary console 228 (e.g., a user device 130) and exemplary servers 218 (e.g., streaming server 220, the motivation server 125, a user-generated content (UGC) server 232, and an object server 226) are shown. In one example, the console 228 may be implemented on the platform servers 120, a cloud server, or on any of the servers 218. In an exemplary example, a content recorder 202 may be implemented on the platform servers 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be sent to the motivation server 125 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object begins and ends. The object library 204 and the object recorder 206 may be implemented on the platform servers 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the object data onto an object ring-buffer 210 (e.g., ObjectID1, START_TS; ObjectID2, START_TS; ObjectID3, START_TS). Such object data recorded onto the object ring-buffer 210 may be stored in the object file 216.

Such object file 216 may also include activity start times, activity end times, an activity ID, activity results, activity types (e.g., tutorial interaction, menu access, competitive match, quest, task, etc.), user or peer data related to the activity. For example, an object file 216 may store data regarding an in-game skill used, an attempt to use a skill, or success or failure rate of using a skill during the activity. Such object file 216 may be stored on the object server 226, though the object file 216 may be stored on any server, a cloud server, any console 228, or any user device 130.

The object recorder 206 may further record biometric data in each of the object files 216. Alternatively, a separate biometric recorder may similarly record the biometric data with corresponding timestamp files. The biometric data may also be recorded in a different fashion, so long as the real-time biometric data is tracked and associated with timestamps that associated the biometric data with respective object data. The object files captured by UDS 200 may be accessed by the platform servers 120 as to the user, the game title, the specific activity being engaged by the user in a game environment of the game title, and similar users, game titles, and in-game activities. Such data may be compared to data from the current session to identify with granularity the kinds of stimuli being presented to a player in a virtual reality environment at various points in time of a current session.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

As shown in the exemplary table 300 of FIG. 3, such object data (e.g., the object file 216) may be associated with event information regarding activity availability change and may be related to other objects with associated event information. For example, such object data may be zone data files 302, actor data files 304, mechanics data files 306, game media data files 308, and other gameplay-related data files.

Such object data (e.g., the object file 216) may be categorized as in in progress, open-ended, or competitive. Such object data files 216 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such object data files 216 may include an activity availability change event for, which may indicate a list or array of currently available activities for the player. For example, this may be used to decide what activities to display in a game plan.

Such zone data files 302 may indicate an area of an associated game world with a single coordinate system wherein the zone may have a 2-D map associated with it, and may be used to display locations on the zone. If zone data files 302 are applicable, each zone may include a zone ID and a short localizable name of the Zone. Such zone data files 302 may be associated with a view projection matrix (4×4) to convert from 3-D world coordinates to a 2-D map position. Such zone data files 302 may be associated with a location change event that indicates an update to a current in-game location of the player. Such location change event may be posted regularly, or whenever the player's in-game location changes significantly. The platform servers 120 may store a latest value in 'state.' Such zone data files 302 may include an x, y, z position of the player's character in the zone as well as an a, b, c vector indicating the player's characters orientation or direction. Such zone data files 302 may be associate with an activity start event and/or an activity end event and for the activity end event, an outcome of completed, failed, or abandoned may be associated to the activity (e.g., activity ID).

Such actor data files 304 may be associated with an entity with behaviors in the game and can be player-controller or game-controlled and can change dynamically during gameplay. Such actor data files 304 may include an actor ID for the actor, a localizable name for the actor, an image of the actor, and/or a short description of the actor. Such actor data files 304 may be associated with an actor select event that indicates that the player's selected actor(s) have changed. The selected actor(s) may represent the actors the player is controlling in the game and may be displayed on the player's profile and other spaces via the platform servers 120. There may be more than one actor selected at time and each game may replace its list of actors upon loading save data.

Such mechanics data files 306 may be associated with an item, skill, or effect that can be used by the player or the game to impact gameplay (e.g., bow, arrow, stealth attack, fire damage) and may exclude items that do no impact gameplay (e.g., collectibles). Such mechanics data files 306 may include a mechanic ID of the mechanic, a short name of the mechanic, an image of the mechanic, and/or a short description of the mechanic. Such mechanics data files 306 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 306 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform servers 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 306 may be associated with a mechanic use event that indicates that a mechanic has been used by or against the player and may be used to be displayed as mechanic usage in a UGC context. Such mechanics data files 306 may include a list or array of mechanics that were used (e.g, fire arrow, fire damage) or whether an initiator is the player, such that whether the mechanics were used by or against the player. Such mechanics data files 306 may include an initiator actor ID, a current zone ID of the initiator actor, and/or a current x, y, z position of the initiator actor. Such mechanics data files 306 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 306 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 308 may be include a game media ID of the game media, a localizable name for the game media, a media format (e.g., image, audio, video, text, etc.), a category or type of media (e.g., cut-scene, audiolog, poster, developer commentary, etc.), a URL or a server-provisioned media file, and/or whether the game media is associated with a particular activity. Such game media data files 308 may be associated with a game media start event that indicates that a particular piece of game media has started in the game right now and a game media end event that indicates that the particular piece of game media has ended.

Object data (e.g., activity data, zone data, actor data, mechanics data, etc.) may be associated with one another to form object-object associations. The object data may also be associated with the media files (e.g., media file 212) and for media-object bindings. These object-object associations and media-object bindings, along with other associations made with respect to aspects (e.g., activities, actors, actions, etc.) displayed in the media, may indicate particular patterns such that future object data may be predicted based on such associations that form object aggregations. Object aggregations may form one or more relationships between the object data through algorithms, logic functions, statistical analysis, and other dataset analyses.

Figure 4:
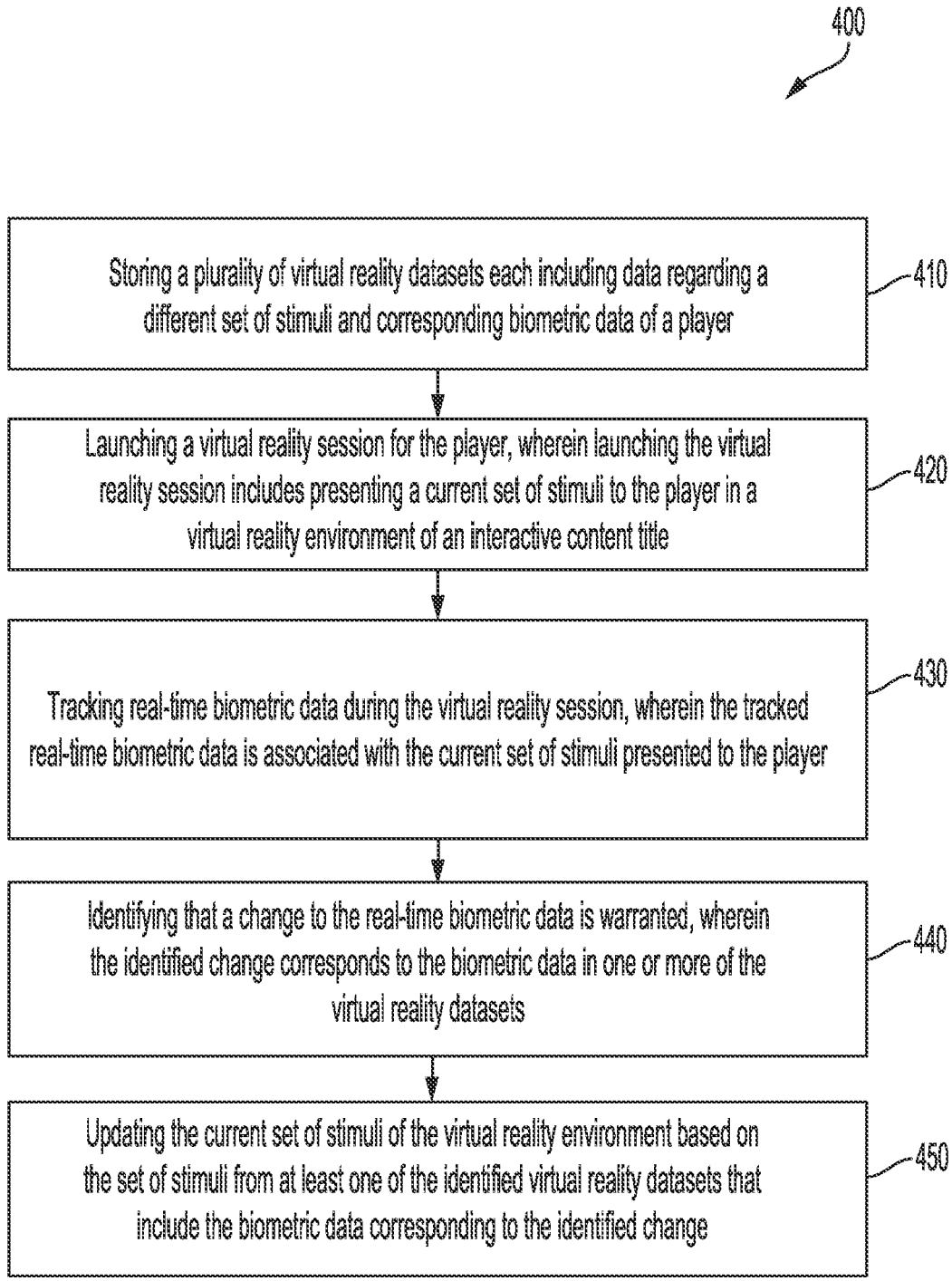
FIG. 4 is a flowchart illustrating an exemplary method for providing a memory-based motivational mode in virtual reality.

FIG. 4 is a flowchart illustrating an exemplary method 400 for memory-based motivational mode in virtual reality, according to some aspects of the present disclosure. The steps identified in FIG. 4 are exemplary and may include various alternatives, equivalents, or derivations thereof including but not limited to the order of execution of the same. The steps of the process of FIG. 4 and any alternative similar processes may be embodied in hardware or software including a computer-readable storage medium including instructions executable by the likes of a processor in a computing device.

In step 410, a plurality of virtual reality datasets may be stored. Each virtual reality dataset may include data regarding a different set of stimuli and corresponding biometric data of a player. For example, each virtual reality dataset may be directed at an audiovisual or sensory stimulus that, when displayed in a virtual reality environment, may elicit changes in biometric data of the player viewing or experiencing the stimulus. Each virtual reality dataset may be sufficient to cause to recreate the associated audiovisual or sensory stimulus or may merely include data that triggers the platform servers 120 to retrieve stored cloud data via the interactive content source servers 110.

In step 420, a virtual reality session may be launched for the player. A virtual reality session may be one in which the player is wearing a virtual reality headset, and may further include other virtual reality equipment, such as a virtual reality treadmill, for example. Launching the virtual reality session may include presenting a current set of stimuli to the player in a virtual reality environment of an interactive content title. In presenting a current set of stimuli, the player may be able to see and/or hear in a virtual reality environment, various audiovisual effects and stimuli, such as a setting in which the player is placed, other non-player characters that may be engaging with the player, sounds and music, etc. In addition, current set of stimuli may include various sensory effects, such as temperature changes, water spraying, tapping, light zapping, etc. These sensory effects may be controlled by sensory components that may be incorporated in the user device 130, such as a virtual reality headset, another virtual reality equipment, or in as a separate equipment.

In step 430, real-time biometric data may be tracked during the virtual reality session. The tracked real-time biometric data may be associated with the current set of stimuli presented to the player. The user device 130 may further include biometric sensors such as heart-rate sensors, accelerometer and/or photoplethysmography (PPG) sensors, or any other sensor that can be used to calculate calories burned or energy exerted. The user device 130 may include or otherwise associated with one or more sensor devices including biometric sensors, a computing device including the biometric sensors, or a virtual reality equipment including biometric sensors. For example, the biometric sensors included on or associated with a virtual reality equipment may be capable of measuring electrodermal activity, or galvanic skin response and also record heart rate using the biometric sensors. The biometric sensors may measure and record any variety of biometric data known in the art, including but not limited to a heart rate, heart rate variability, breath rate etc. The captured biometric data may further be displayed in a display of the user device 130.

In step 440, a change to the real-time biometric data that is warranted may be identified. The identified change may correspond to the biometric data in one or more of the virtual reality datasets. The identified change being warranted may be based on a threshold of change that is set as a default or by the player, whereby the real-time biometric data may either be stagnant for too long a period of time or has dipped below a desired level. For example, the player may set that a change is warranted when the BPM has dropped under 100 for more than 3 minutes.

In step 450, the current set of stimuli of the virtual reality environment may be updated based on the set of stimuli from at least one of the identified virtual reality datasets that include the biometric data corresponding to the identified change. One or more preferences associated with the player may be received. According to some examples, identifying that the change to the real-time biometric data is warranted may include comparing the real-time biometric data to those preferences. The preferences may include, for example, that the player is motivated by financial incentives, whereby based on past sessions, the player, on average, increased their BPM by 10% when offered a gift card if the player could increase their speed and get to a certain location by a certain time. Another example could be that the player increases their endurance when music with a higher BPM is played when the BPM of the player starts decreasing after a certain period of time.

The motivation server 125 may learn, based on past datasets correlated to past biometric data, what motivates and stimulates the player and at what point in a session does certain stimuli is best served. The motivation server 125 may further train a learning model based on the current set of stimuli and the tracked real-time biometric data. The learning model may correlate each stimulus in the current set with at least a portion of the real-time biometric data. As such, the learning model may be used to determine what kinds of stimulus is best suited for the player as changes of BPM are continuously tracked. In some cases, combinations of various stimuli may be ideal for the player in certain circumstances. Therefore, other biometric data through the day may be used as inputs to better train the learning model. For example, if the player had already exerted many calories during the day, the The identified change may include a delta between the tracked real-time biometric data and one or more stored goals and the at least one identified virtual reality dataset may be selected based on the delta. For example, one of the goals may be set as a default that if the player reaches 300 burned calories, and if the delta is about 50 calories to go, the default setting may be to have the player give it all they've got in a sprint and selecting a highest motivational combination of stimuli. The delta may also be zero, meaning that the player has reached 300 burned calories, and with a delta of zero, the motivation server 125 may determine to remove that highest motivational combination of stimuli and allow the player to cool down in a more relaxing virtual environment.

The stimuli in one or more of the virtual reality datasets may include at least one of music types, temperatures, audio-visuals, and sensory effects. Updating the current set of stimuli may include controlling sensory or temperature components in real-time, wherein the sensory or temperature components provide one or more immersive effects in the virtual reality environment. As mentioned previously, the sensory components may add a more immersive experience. For example, a heating aspect may be added as a level of discomfort if the player is slowing down, motivating the player to increase their BPM to experience a cooler sensation while exercising. Furthermore, identifying that a change to the real-time biometric data is warranted may further include identifying a trigger associated with one or more detected environmental conditions. For example, a change may be warranted because a detected environmental condition, such as fogging of a virtual reality headset, may trigger a cooling fan component to turn on.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 555. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 594 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing a memory-based motivational mode in virtual reality, the method comprising:
   storing a plurality of virtual reality datasets associated with a player, each virtual reality dataset including historical data regarding a different set of stimuli and corresponding biometric data of the player;
   training a learning model based on the virtual reality datasets, wherein the learning model is trained to correlate one or more stimuli to biometric data;
   launching a virtual reality session for the player, wherein launching the virtual reality session includes providing a current set of stimuli to the player in a virtual reality environment of an interactive content title;
   tracking real-time biometric data relative to a customized threshold set by the player during the virtual reality session, wherein the tracked real-time biometric data is associated with the current set of stimuli presented to the player;
   identifying that a change to the current set of stimuli is warranted by comparing the real-time biometric data to the customization threshold set by the player, wherein the learning model determines which stimuli correlate to the identified change associated with a corresponding change to the biometric data; and updating the current set of stimuli of the virtual reality environment based on the stimuli determined by the learning model from among at least one of the identified virtual reality datasets that include the biometric data corresponding to the identified change.

2. The method of claim 1, further comprising receiving one or more preferences associated with the player, wherein identifying that the change to the current set of stimuli is warranted further includes comparing the real-time biometric data to the preferences.

3. The method of claim 1, wherein the identified change corresponds to a delta between the tracked real-time biometric data and one or more stored goals, and further comprising selecting the at least one identified virtual reality dataset based on the delta.

4. The method of claim 1, wherein training the learning model includes identifying one or more patterns regarding one or more sets of stimuli and a change in performance by the player in the virtual environment.

5. The method of claim 1, wherein the stimuli in one or more of the virtual reality datasets include one or more sensory effects corresponding to at least one of music types, temperatures, audio-visuals, and haptic effects.

6. The method of claim 1, wherein updating the current set of stimuli includes controlling sensory or temperature components in real-time, wherein the sensory or temperature components control one or more sensory effects in the virtual reality environment.

7. The method of claim 1, wherein identifying that a change to the current set of stimuli is warranted includes identifying a trigger associated with one or more detected environmental conditions.

8. The method of claim 1, wherein training the learning model includes identifying one or more patterns regarding one or more sets of stimuli that result in a biometric reaction by the player.

9. The method of claim 1, wherein updating the current set of stimuli of the virtual reality environment includes adding a virtual object to the virtual environment.

10. The method of claim 9, wherein updating the current set of stimuli of the virtual reality environment further includes pairing one or more different sensory effects associated with the virtual object.

11. The method of claim 9, wherein the virtual object includes a virtual non-player character or creature.

12. The method of claim 1, wherein the virtual reality datasets used to train the learning model are specific to the player, and wherein a different learning model trained using different virtual reality datasets specific to a different player result in different updates to the virtual environment.

13. A system for providing a memory-based motivational mode in virtual reality, the system comprising:
memory that stores a plurality of virtual reality datasets associated with a player, each virtual reality dataset including historical data regarding a different set of stimuli and corresponding biometric data of the player;
a communication interface that communicates over a communication network with a user device of the player, wherein the communication interface communicates with the user device to launch a virtual reality session for the player, wherein launching the virtual reality session includes providing a current set of stimuli to the player in a virtual reality environment of an interactive content title; and
a processor that executes instructions stored in memory, wherein the processor executes the instructions to:
train a learning model based on the virtual reality datasets, wherein the learning model is trained to correlate one or more stimuli to biometric data;
track real-time biometric data relative to a customized threshold set by the player during the virtual reality session, wherein the tracked real-time biometric data is associated with the current set of stimuli presented to the player;
identify that a change to the current set of stimuli is warranted by comparing the real-time biometric data to the customization threshold set by the player, wherein the learning model determines which stimuli correlate to the identified change associated with a corresponding change to the biometric data; and
update the current set of stimuli of the virtual reality environment based on the stimuli determined by the learning model from among at least one of the identified virtual reality datasets that include the biometric data corresponding to the identified change.

14. The system of claim 13, wherein the communication interface further receives one or more preferences associated with the player, and wherein the processor identifies that the change to the current set of stimuli is warranted by further comparing the real-time biometric data to the preferences.

15. The system of claim 13, wherein the identified change corresponds to a delta between the tracked real-time biometric data and one or more stored goals, and wherein the processor executes further instructions to select the at least one identified virtual reality dataset based on the delta.

16. The system of claim 13, wherein the processor trains the learning model includes identifying one or more patterns regarding one or more sets of stimuli and a change in performance by the player in the virtual environment.

17. The system of claim 13, wherein the stimuli in one or more of the virtual reality datasets include one or more sensory effects corresponding to at least one of music types, temperatures, audio-visuals, and haptic effects.

18. The system of claim 13, wherein the processor updates the current set of stimuli by controlling sensory or temperature components in real-time, wherein the sensory or temperature components control one or more sensory effects in the virtual reality environment.

19. The system of claim 18, wherein the processor identifies that a change to the current set of stimuli is warranted by identifying a trigger associated with one or more detected environmental conditions.

20. A non-transitory, computer-readable storage medium, having embodied thereon instructions executable by a computing system to perform a method for providing a memory-based motivational mode in virtual reality, the method comprising:
storing a plurality of virtual reality datasets associated with a player, each virtual reality dataset including historical data regarding a different set of stimuli and corresponding biometric data of the player;
training a learning model based on the virtual reality datasets, wherein the learning model is trained to correlate one or more stimuli to biometric data;
launching a virtual reality session for the player, wherein launching the virtual reality session includes providing a current set of stimuli to the player in a virtual reality environment of an interactive content title;
tracking real-time biometric data relative to a customized threshold set by the player during the virtual reality session, wherein the tracked real-time biometric data is associated with the current set of stimuli presented to the player;

identifying that a change to the current set of stimuli is warranted by comparing the real-time biometric data to the customization threshold set by the player, wherein the learning model determines which stimuli correlate to the identified change associated with a corresponding change to the biometric data; and updating the current set of stimuli of the virtual reality environment based on the stimuli determined by the learning model from among at least one of the identified virtual reality datasets that include the biometric data corresponding to the identified change.

* * * * *